(12) United States Patent
Blouin et al.

(10) Patent No.: US 7,049,725 B2
(45) Date of Patent: May 23, 2006

(54) DYNAMOELECTRIC MACHINE STATOR AND METHOD FOR MOUNTING PREWOUND COILS THEREUNTO

(75) Inventors: Pierre Blouin, Boucherville (CA);
Stéphane Poulin, Ste-Julie (CA)

(73) Assignee: TM4 Inc., Québec (CA)

( * ) Notice: Subject to any disclaimer, the term of this patent is extended or adjusted under 35 U.S.C. 154(b) by 0 days.

(21) Appl. No.: 10/722,687

(22) Filed: Nov. 24, 2003

(65) Prior Publication Data

US 2005/0110361 A1    May 26, 2005

(51) Int. Cl.
*H02K 3/30* (2006.01)
*H02K 3/32* (2006.01)
*H02K 3/34* (2006.01)

(52) U.S. Cl. ..................... 310/216; 310/254
(58) Field of Classification Search ............... 310/216, 310/214, 201, 208, 254
See application file for complete search history.

(56) References Cited

U.S. PATENT DOCUMENTS

| | | | |
|---|---|---|---|
| 1,808,749 A * | 6/1931 | Apple | 310/201 |
| 3,600,618 A * | 8/1971 | Nicholas et al. | 310/216 |
| 5,355,039 A | 10/1994 | Couture | |
| 5,637,943 A * | 6/1997 | Berger | 310/211 |
| 5,714,824 A | 2/1998 | Couture et al. | |
| 6,335,582 B1 | 1/2002 | Abulawa et al. | 310/214 |
| 6,441,527 B1 * | 8/2002 | Taji et al. | 310/201 |

FOREIGN PATENT DOCUMENTS

CA    2 401 027 A1    8/2001

OTHER PUBLICATIONS

PCT Intrenational Search Report ; Chris Petzinger; Mar. 14, 2005; 3 Pages.

* cited by examiner

*Primary Examiner*—Tran Nguyen
(74) *Attorney, Agent, or Firm*—Lorusso & Associates

(57) ABSTRACT

A dynamoelectric machine stator core for receiving a preformed stator winding includes a core body defining a cylindrical core main peripheral surface. A plurality of axially extending stator slots are circumferentially spaced in the core body. Each of the stator slots defines a slot first section extending radially from the slot base to a slot intermediate radial position and a slot second section extending radially from the slot intermediate radial position towards the core main peripheral surface. The slot first and second sections communicate with each other and are circumferentially offset relative to each other. The slot first and second sections are positioned, configured and sized to facilitate insertion therein of a corresponding conductor section of the stator winding with reduced needs for deforming the latter.

41 Claims, 9 Drawing Sheets

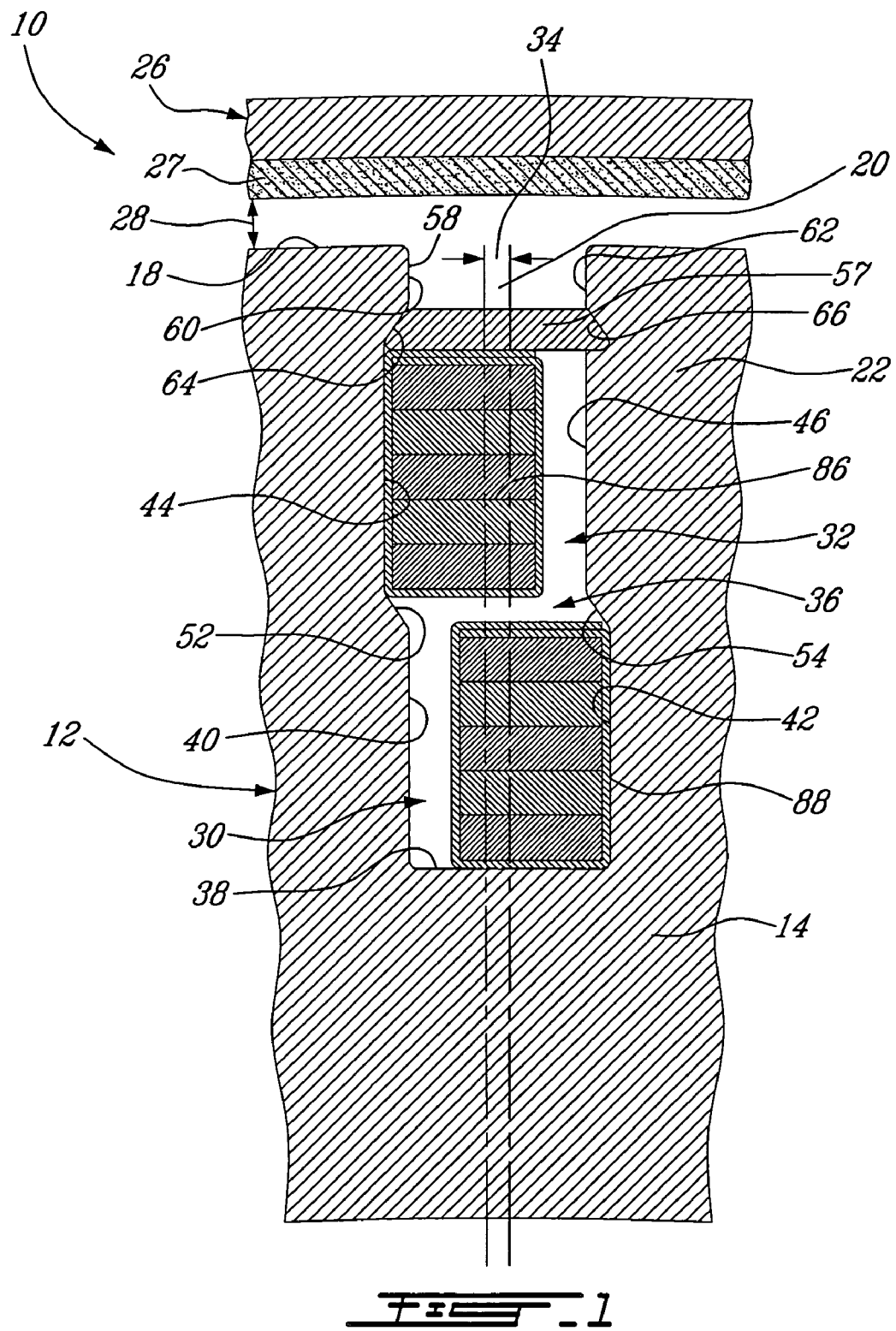

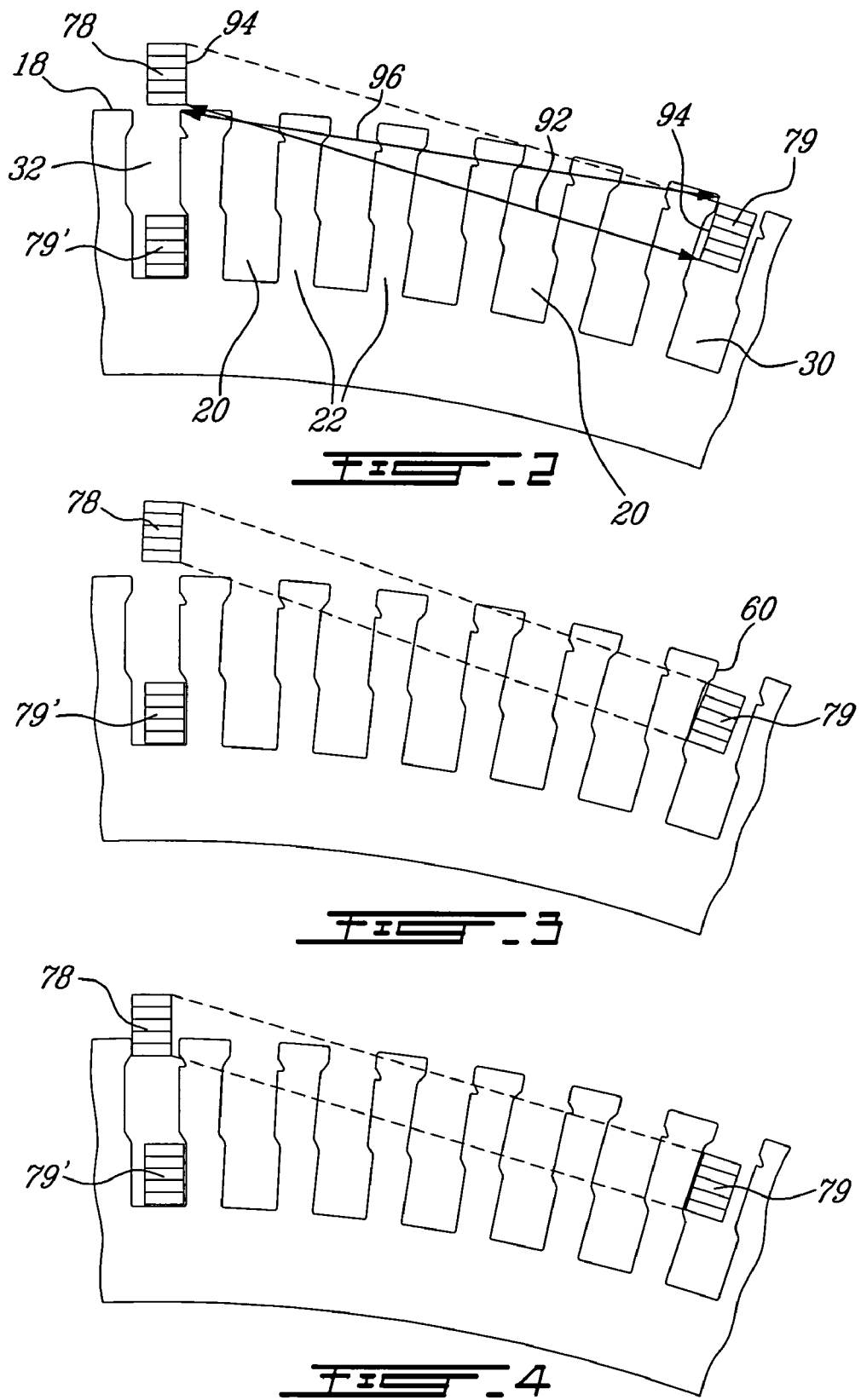

DYNAMOELECTRIC MACHINE STATOR AND METHOD FOR MOUNTING PREWOUND COILS THEREUNTO

FIELD OF THE INVENTION

The present invention relates to the general field of dynamoelectric machines and is particularly concerned with a stator slot configuration and a method for mounting pre-wound coils in stator slots having such stator slot configuration.

BACKGROUND OF THE INVENTION

Dynamoelectric machines such as electric motors, alternators and the like are typically constructed with an annular stator within which a rotating field is rotatably mounted. The stator construction typically includes an annular magnetic core having circumferentially distributed and axially extending stator slots. The stator winding consists of coils spanning the distance of a pole pitch and interconnected together to form groups in accordance with the phase connection.

In some instances, it is advantageous for the stator to be internally positioned relative to an external rotor. For example, U.S. Pat. No. 5,355,039 entitled "ELECTRICLALY MOTORIZED WHEEL ASSEMBLY" issued on Oct. 7, 1994 to Couture describes a rotor-wheel having an external rotor.

Two basically different winding techniques are employed in the manufacture of dynamoelectric machines. In the first winding technique, the particular coil is wound and formed in place in the associated magnetic core. Typically one, or occasionally more than one, relatively flexible conductors are serially led down one core slot in one axial direction, and back in the other axial direction through another core slot a plurality of times, usually by machine to fabricate a coil having a predetermined number of conductor turns. Alternatively, the coil of flexible conductors is wound first around a bobbin to provide a desired coil which is thereafter formed in place in the core slots to provide a machine winding.

The essential attribute of such a first winding technique is that the individual conductors are flexible, like a balling wire, and while the coil so formed may be a compact bundle of conductors, yet the coil itself is readily deformable since the individual conductor strands act essentially independently in the sense that relative movement between conductors is restrained chiefly only by surface friction among adjacent conductors.

The conductors in such winding are typically wound copper or aluminum wires having a thin resinous film or serving of insulating material to provide what is commonly called magnet wire. The machines having windings in accordance with this first technique are oftentimes characterised as "mush" or "random" wound machines.

In some situations, because of insulation requirements or other constraints, it is desirable to resort to the second winding technique using so-called "formed" coils. In this second technique, the coils are pre-formed prior to insertion in the core slots and the machines so constructed are frequently characterised as "formed wound machines". The conductors in the typical formed coils are bars or strips having a substantially rectangular cross-section of copper or aluminum which carry a conductor insulation usually in the form of a plurality of layers of fabric, micaceous material and/or resinous compositions.

After a coil is wound with such conductors, it is thereafter covered with coil insulation that binds the conductors together and severely restricts any relative motion therebetween thereafter. Thus, the "formed" coil is typically a substantially rigid structure relative to the typical "random" coil that does not employ such coil insulation.

An example of a typical "formed wound machine" is disclosed in U.S. Pat. No. 5,714,825 entitled "CONDUCTOR SECTION FOR A STATOR FRAME OF A POLYPHASE DYNAMOELECTRIC MACHINE" issued on Feb. 3, 1998 to Couture et al. This patent discloses a conductor section made of two parallel and generally rectangular conductors provided with a generally U-shaped head interconnecting the two conductors. The stator slots of such "formed wound machines" are typically rectangular in cross-section.

A common problem associated with the manufacture of such "formed wound machines" is related to the difficulty of inserting the pre-formed coils or windings in the stator slots without distorting or deforming the coils so as to reduce the risks of damaging the insulation thereof and potentially causing short circuits or the like. The problem is compounded in situations, such as exemplified by U.S. Pat. No. 5,714,824, wherein the stator is internal, having stator slots that project outwardly and, therefore, radially fan outwardly. Indeed, the radially outward opening of two slots being at a greater distance than the radially inwardly located opening of the same two slots, insertion of conventional pre-formed coils inherently requires at least temporary deformation thereof.

Accordingly, there exists a need for an improved dynamoelectric machine stator and an improved method for mounting pre-wound coils thereunto.

OBJECTS OF THE INVENTION

It is hence a general object of the present invention to provide such an improved dynamoelectric machine stator and method for mounting pre-wound coils thereunto.

SUMMARY OF THE INVENTION

Advantages of the present invention include that the proposed dynamoelectric machine stator is provided with slots allowing for insertion thereinto of pre-wound coils or windings with reduced or absent need for distorting or otherwise deforming the coils or windings. Accordingly, the stator slots of the proposed dynamoelectric machine stator inherently reduce the risks of damaging the insulation of the coils and, hence, reduce the risks of potentially causing short circuits.

Furthermore, the proposed dynamoelectric machine stator is provided with slots allowing for insertion thereinto of pre-formed coils through a set of relatively quick and ergonomic steps without the need for tooling or manual dexterity. Still furthermore, the proposed dynamoelectric machine stator is provided with stator slots allowing for insertion thereinto of pre-wound coils through steps that may be optionally automated.

The proposed method for mounting the pre-wound coils into the stator slots of the dynamoelectric machine stator, in accordance with the present invention, enables the manufacture of a dynamoelectric machine stator that is economically feasible.

In accordance with one aspect of the present invention, there is provided a dynamoelectric machine stator core for receiving a stator winding, the stator core comprising: a core body defining a pair of axially opposed core end surfaces and a substantially cylindrical core main peripheral surface extending between the core end surfaces; a plurality of substantially axially extending stator slots circumferentially spaced in the core body, the stator slots defining intervening teeth projecting substantially radially towards the core main peripheral surface; each of the stator slots extending radially from a corresponding slot base to the core main peripheral surface;

wherein each of the stator slots defines a slot first section extending radially from the slot base to a slot intermediate radial position located intermediate the slot base and the core main peripheral surface; a slot second section extending radially from substantially adjacent the slot intermediate radial position towards the core main peripheral surface;

the slot first and second sections communicating with each other and being in a circumferentially offset relationship relative to each other, and being positioned, configured and sized to facilitate insertion therein of a corresponding conductor section of the stator winding with reduced needs for deforming the corresponding conductor section.

In accordance with another aspect of the invention, there is also provided dynamoelectric machine stator core for receiving a stator winding, the stator core comprising: a core body defining a pair of axially opposed core end surfaces and a substantially cylindrical core main peripheral surface extending between the core end surfaces; a plurality of substantially axially extending stator slots circumferentially spaced in the core body, the stator slots defining intervening teeth projecting substantially radially towards the core main peripheral surface; each of the stator slots extending radially from a corresponding slot base to the core main peripheral surface; wherein each of the stator slots defines- a radially innermost slot base wall; circumferentially opposed first section first and second walls extending substantially perpendicularly from the slot base wall towards the core main peripheral surface; first and second intermediate wall segments extending respectively from the first section first and second walls at an angle relative to the latter; second section first and second walls extending respectively from first and second intermediate wall segments in a substantially parallel and circumferentially offset relationship relative respectively to the first section first and second walls; the second section defining a retaining segment positioned adjacent the core main peripheral surface, the retaining segment having a retaining groove formed therein for receiving a peripheral portion of the retaining plate and retaining the latter.

In accordance with a further aspect of the present invention, there is also provided a dynamoelectric machine stator core for receiving a stator winding, the stator core comprising: a core body defining a pair of axially opposed core end surfaces and a substantially cylindrical core main peripheral surface extending between the core end surfaces; a plurality of circumferentially spaced stator slots extending in the core body with the stator slots defining intervening teeth projecting substantially radially towards the core main peripheral surface; each of the stator slots extending radially from a corresponding slot base to the core main peripheral surface; each of the stator slots defining a first slot wall and a second slot wall both extending substantially radially into the core body in a substantially parallel and circumferentially spaced relationship relative to each other; the first slot wall having a circumferentially recessed first wall recess located substantially adjacent the core main peripheral surface; the second slot wall having a circumferentially recessed second wall recess located substantially adjacent the slot base.

In accordance with still a further aspect of the present invention, there is provided yet still a dynamoelectric machine comprising: a stator having a core body made of ferromagnetic material, the core body defining a pair of axially opposed core end surfaces and a substantially cylindrical core main peripheral surface extending between the core end surfaces; a plurality of substantially axially extending stator slots circumferentially spaced in the core body, the stator slots defining intervening teeth projecting substantially radially towards the core main peripheral surface; each of the stator slots extending radially from a corresponding slot base to the core main peripheral surface; wherein each of the stator slots defines a slot first section extending radially from the slot base to a slot intermediate radial position located intermediate the slot base and the core main peripheral surface; a slot second section extending radially from substantially adjacent the slot intermediate radial position towards the core main peripheral surface; the slot first and second sections communicating with each other and being in a circumferentially offset relationship relative to each other; a stator winding embedded in the stator slots; a rotor made of ferromagnetic material positioned so as to define a substantially cylindrical stator-to-rotor gap between the core main peripheral surface and the rotor, the rotor being supported for rotational movement relative to the stator, the rotor including conductive means for interacting with a magnetic field produced in the stator-to-rotor gap when the stator winding is energized whereby the slot first and second sections are positioned, configured and sized to facilitate insertion therein of a corresponding conductor section of the stator winding with reduced needs for deforming the corresponding conductor section.

In accordance with still another aspect of the present invention, there is provided a lamination plate for forming the stator core of a stator, part of a dynamoelectric machine, when aligned and stacked with similar lamination plates, the lamination plate comprising:

a plate body made of ferromagnetic material, the plate body defining a pair of axially opposed plate end surfaces and a substantially annular plate main peripheral surface extending between the plate end surfaces; a plurality of substantially axially extending stator slots circumferentially spaced in the plate body, the stator slots defining intervening teeth projecting substantially radially towards the plate main peripheral surface; each of the stator slots extending radially from a corresponding slot base to the plate main peripheral surface; wherein each of the stator slots defines a slot first section extending radially from the slot base to a slot intermediate radial position located intermediate the slot base and the plate main peripheral surface; a slot second section extending radially from substantially adjacent the slot intermediate radial position towards the plate main peripheral surface; the slot first and second sections communicating with each other and being in a circumferentially offset relationship relative to each other.

The present invention further relates to a method for mounting a conductor section part of a stator winding onto a stator core of a dynamoelectric machine, the conductor section having two substantially parallel conductor sides and at least one conductor head connecting two adjacent ends of the conductor sides; the stator core defining a pair of axially opposed core end surfaces and a substantially cylindrical core main peripheral surface extending between the core end surfaces; at least two circumferentially spaced stator slots extending substantially axially in the core body, the stator slots defining intervening teeth projecting substantially radially towards the core main peripheral surface; each of the stator slots extending radially from a corresponding slot base to the core main peripheral surface with each of the stator slots defining a slot first section extending radially from the slot base to a slot intermediate radial position located intermediate the slot base and the core main peripheral surface and a slot second section extending radially from substantially adjacent the slot intermediate radial position towards the core main peripheral surface, the slot first and second sections communicating with each other and being in a circumferentially offset relationship relative to each other; the distance between circumferentially opposite lateral surfaces of the conductor sides being smaller then the distance between circumferentially adjacent lateral surfaces of the at least two stator slots; the method comprising:

without substantially deforming the conductor section, manipulating the conductor section so as to insert a first one of the conductor sides in the slot first section of the first one of the stator slots and a second one of the conductor sides in the slot second section of the second one of the stator slots.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

Embodiments of the present invention will now be disclosed, by way of example, in reference to the following drawings in which:

FIG. 1, in a partial transversal cross-sectional view with sections taken out, illustrates a stator slot, part of a dynamoelectric machine stator in accordance an embodiment of the present invention, the stator slot being shown with a pair of coil sides mounted therein;

FIG. 2, in a partial cross-sectional view with sections taken out, illustrates a circumferential section of a dynamoelectric machine stator in accordance with an embodiment of the present invention, the circumferential section being shown with a coil being mounted thereunto, the right-hand side coil section being inserted into a corresponding slot;

FIG. 3, in a view similar to FIG. 2, illustrates the circumferential section with a coil being mounted thereunto, the right-hand side coil section being inserted into a distal circumferentially offset slot section;

FIG. 4, in a view similar to FIG. 2, illustrates the circumferential section with a coil being mounted thereunto, the left-hand side coil section being inserted into a corresponding slot;

DETAILED DESCRIPTION

Figure 14:
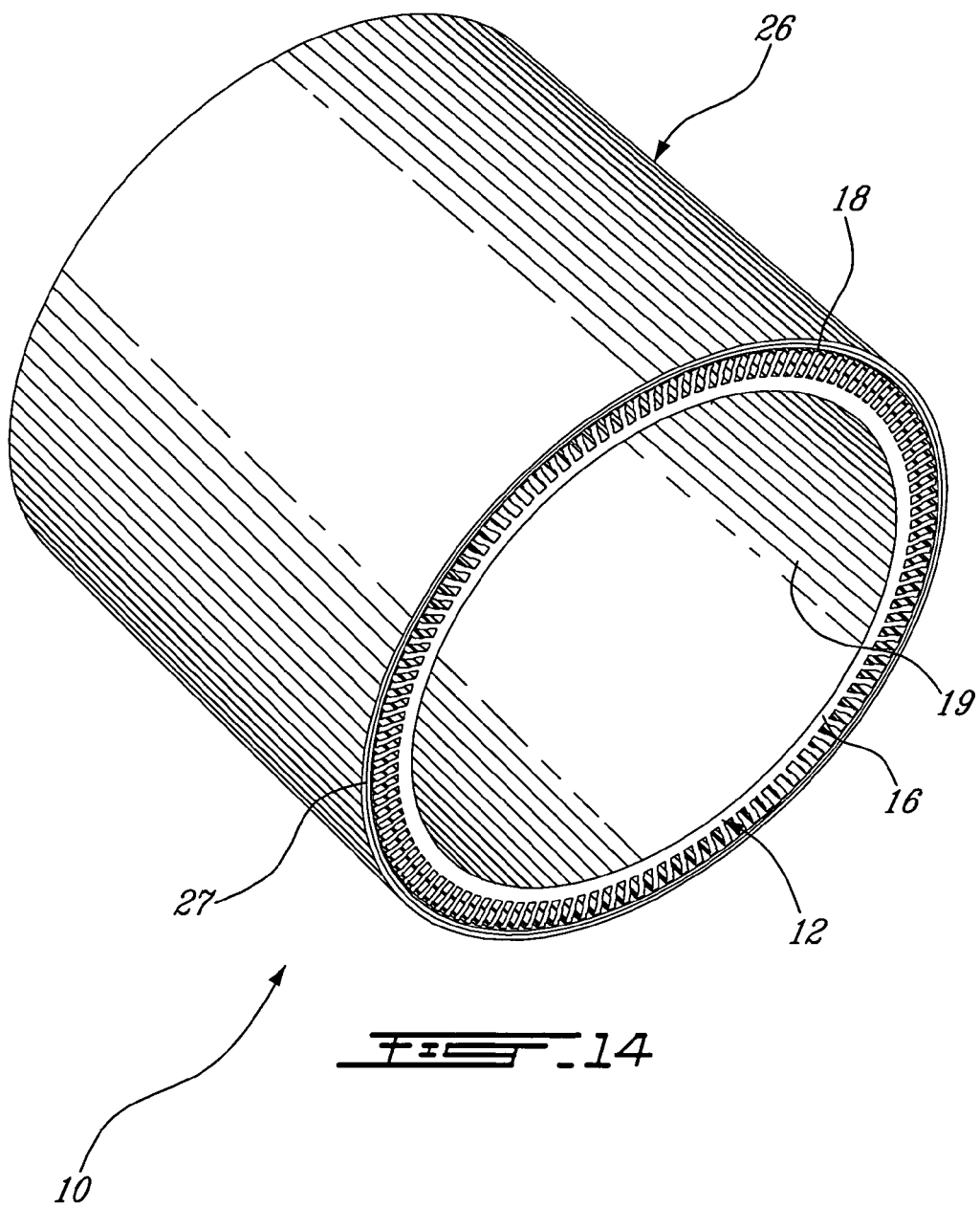
FIG. 14, in a partial perspective view with sections taken out, illustrates part of a dynamoelectric machine in accordance with an embodiment of the present invention.

Referring to FIG. 14, there is schematically shown part of a dynamoelectric machine generally indicated by the reference numeral 10. The dynamoelectric machine 10 has a stator core generally indicated by the reference numeral 12 in accordance with an embodiment of the present invention. The machine 10 also includes a rotor 26.

Although the present invention is hereinafter disclosed in the context of an electric machine having a radially inwardly located stator and a radially outwardly positioned rotor, it should be understood that the inventive concepts of present invention could be applied to other contexts such as to the rotor portion of the machines instead of the stator portion of the machine and even to other types of dynamoelectric machines having other types of configurations without departing from the scope of the present invention.

In the embodiments shown throughout the figures, the stator core 12 has a core body 14 typically made of ferromagnetic material. The core body 14 defines a pair of axially opposed core end surfaces 16 (only one of which is shown in FIG. 14) and a substantially cylindrical core main peripheral surface 18 extending between the core end surfaces 16. Also, in the embodiment shown throughout the figures, the stator core 14 further defines a radially innermost and substantially cylindrical core auxiliary peripheral surface 19. Typically, each of the core end surfaces 16 hence has a substantially annular configuration.

Although the core main peripheral surface 18 is shown throughout the figures as being radially outwardly located, it should be understood that the core main peripheral surface 18 could be radially inwardly located without departing from the scope of the present invention.

The stator core 12 also includes a plurality of substantially axially extending stator slots 20 circumferentially spaced in the core body 14. The stator slots 20 define intervening teeth 22 projecting substantially radially towards the core main peripheral surface 18. Each of the stator slots 20 extends radially from a corresponding slot base to the core main peripheral surface 18.

Figure 13:
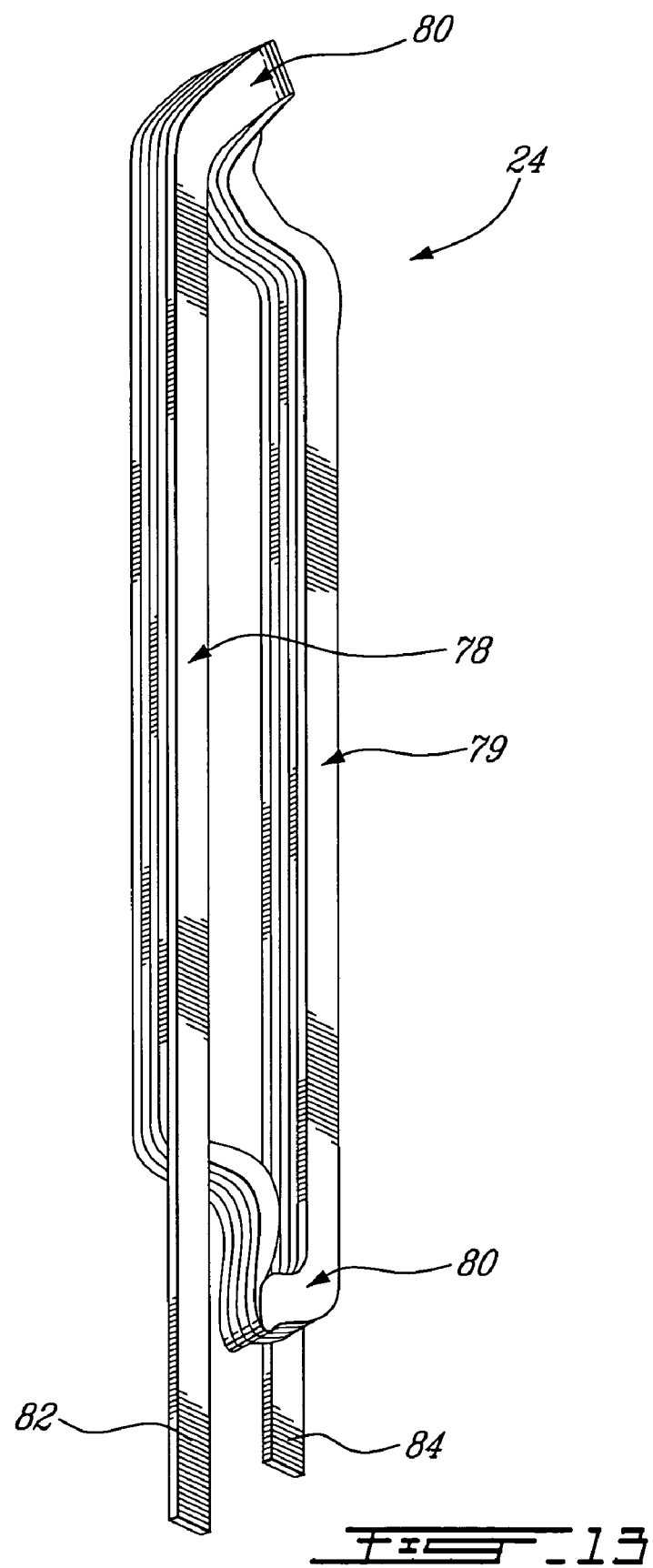
FIG. 13, in a perspective view, illustrates a winding section part of the stator winding of a dynamoelectric machine in accordance with an embodiment of the present invention.

The machine 10 also includes a stator winding embedded in the stator slots 20. FIG. 13 illustrates a winding section 24 hereinafter described in greater details, part of a stator winding disclosed by way of example. It should, however, be understood that other types of windings having other types of configurations could be used without departing from the scope of the present invention.

As can be better seen in FIG. 1, the rotor 26, typically made out of ferro-magnetic material and including permanent magnets 27, is positioned so as to define a substantially cylindrical stator-to-rotor gap 28 between the core main peripheral surface 18 and an adjacent surface of the magnets 27. The rotor 26 is supported for rotational movement relative to the stator 14. Of course, the magnets 27 could be replaced by windings without departing from the scope of the present invention.

Typically, the stator 14 is made of stator lamination plates (not shown). The stator lamination plates are typically aligned and stacked together to form respectively the stator 14.

One of the characteristics of the stator core 12 in accordance with the present invention resides in that each of the stator slots 20 typically defines a slot first section 30 and a slot second section 32. The slot first section 30 extends substantially radially from the slot base to a slot intermediate radial position located intermediate the slot base and the core main peripheral surface 18. The slot second section 32 extends substantially radially from substantially adjacent the slot intermediate radial position towards the core main peripheral surface 18.

The slot first and second sections 30, 32 communicate with each other while being also circumferentially offset relative to each other. Furthermore, the slot first and second sections 30, 32 are positioned, configured and sized so as to facilitate insertion therein of a corresponding conductor section part of a stator winding with reduced needs for deforming the conductor section, as will be described hereinafter.

As illustrated more specifically in FIG. 1, the circumferential offsetting between the slot first and second sections may be expressed in terms of a section offsetting angle 34. The section offsetting angle 34 shown in the appended figures typically has a value of approximately XX degrees.

Each stator slot 20 typically further defines a slot intermediate section 36 extending between corresponding slot first and second sections 30, 32. The slot intermediate section 36 typically extends substantially at an angle relative to the radially extending slot first and second sections 30, 32.

The slot first section 30 typically has a substantially rectangular cross-sectional configuration. The slot first section 30 hence typically defines a substantially flat slot base wall 38, a substantially flat first section first wall 40 and a substantially flat first section second wall 42. The first section first and second walls 40, 42 both extend substantially radially in a substantially circumferentially opposed relationship relative to each other and in a substantially perpendicular relationship relative to the slot base wall 38.

Similarly, the slot second section 32 typically also has a substantially rectangular cross-sectional configuration. The slot second section 32 hence typically defines a substantially flat second section first wall 44 and a substantially flat second section second wall 46. The second section first and second walls 44, 46 both extend substantially radially in a substantially circumferentially opposed relationship relative to each other and in a substantially perpendicular relationship relative to the slot base wall 38.

In other words, each stator slot 20 may be alternatively be described as typically having a first slot wall illustrated by way of example as being on the left-hand side of FIG. 1 and a second slot wall illustrated by way of example as being on the right-hand side of FIG. 1. The slot first and second walls both extend substantially radially into the core body 14 in a substantially parallel and circumferentially spaced relationship relative to each other.

The first slot wall may alternatively be described as having a circumferentially recessed first wall recess located substantially adjacent the core main peripheral surface 18 while the second slot wall has a circumferentially recessed second wall recess located substantially adjacent the slot base wall 38.

Figure 11:
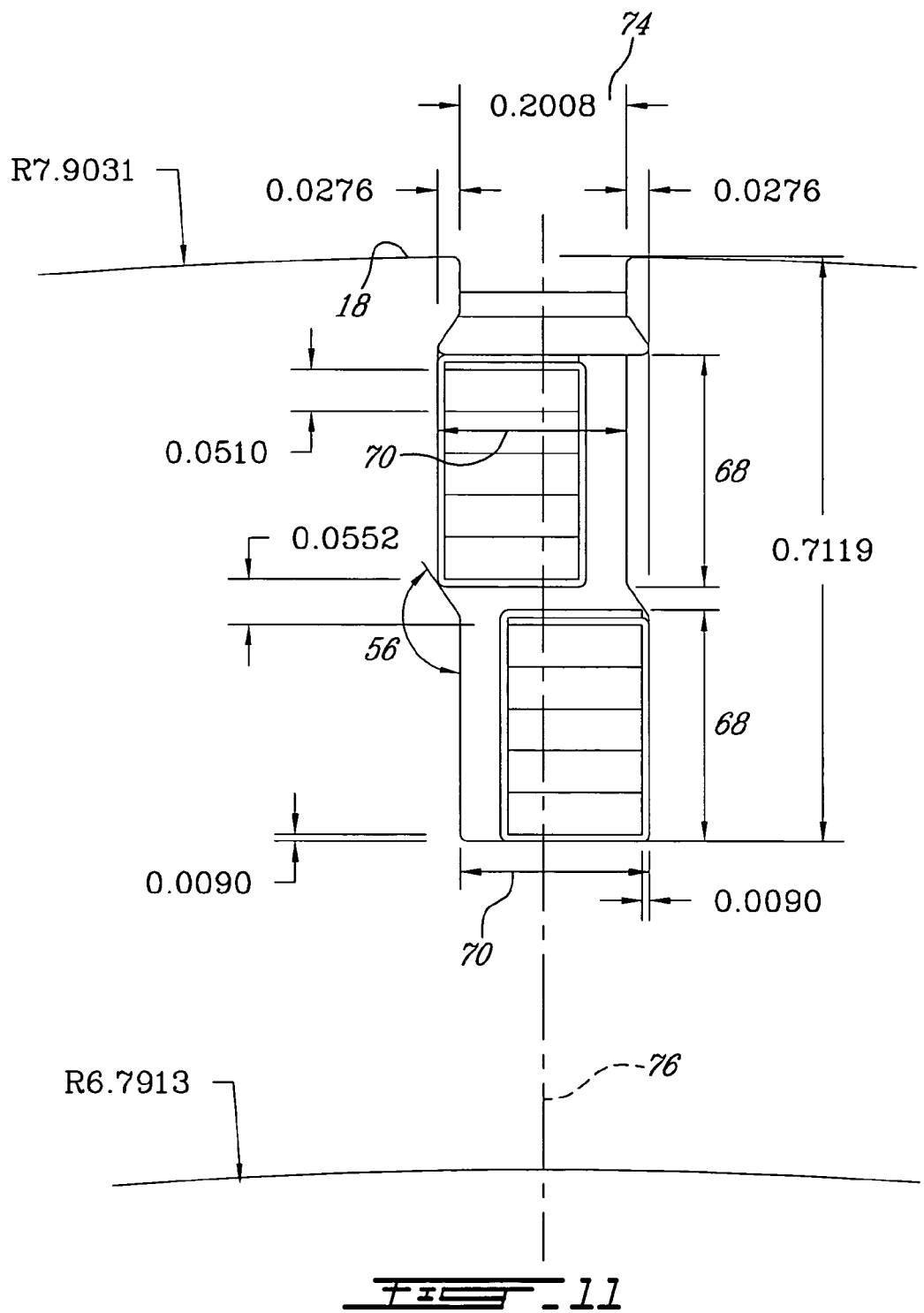
FIG. 11, in a partial transversal cross-sectional view with sections taken out, illustrates a stator slot, part of a dynamoelectric machine stator, in accordance an embodiment of the present invention, the stator slot being shown with a pair of coil sides mounted therein and dimensional values being given by way of example.
Figure 12:
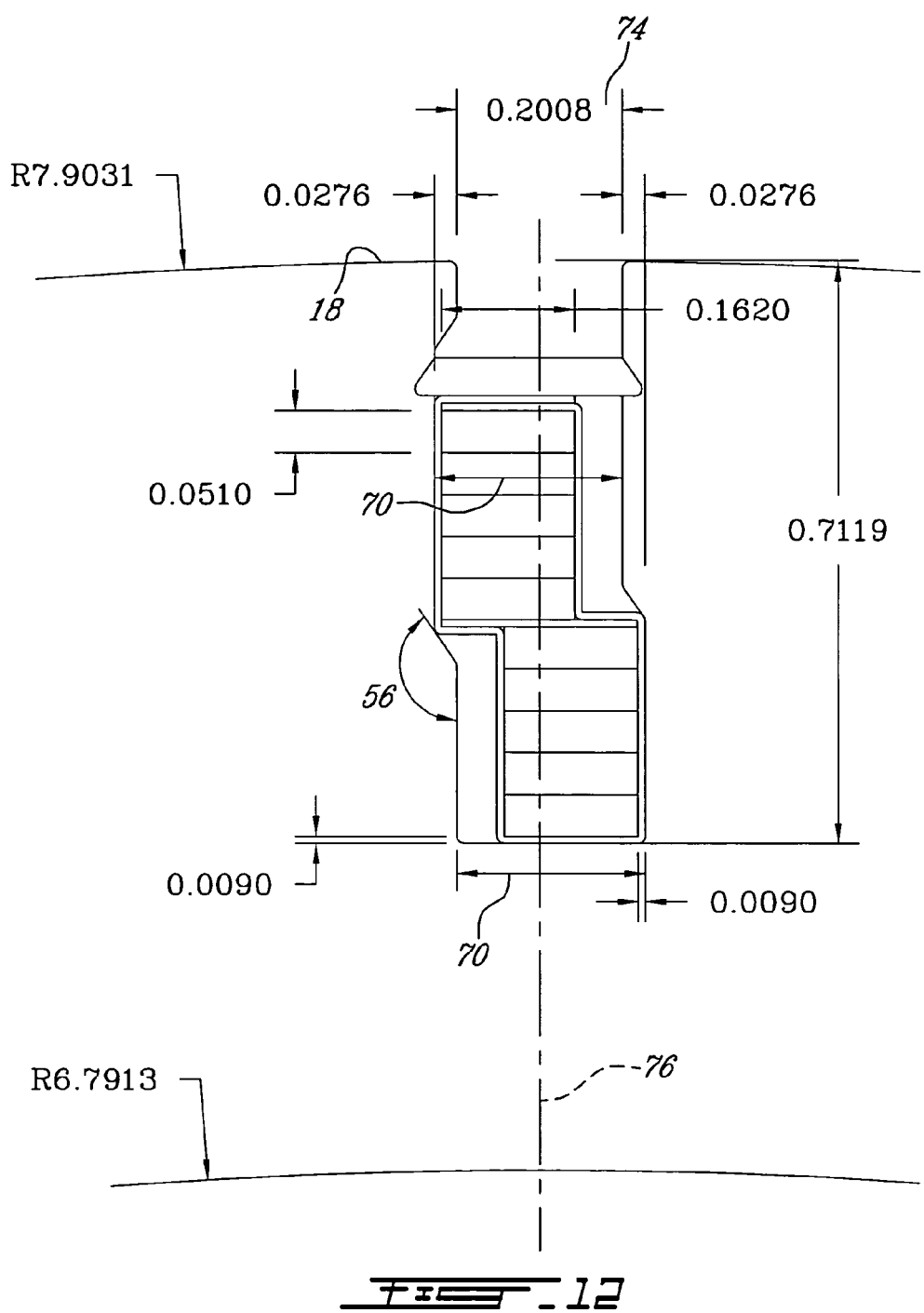
FIG. 12, in a partial cross-sectional view with sections taken out, illustrates a circumferential section of a dynamoelectric machine stator in accordance with an alternative embodiment of the invention, dimensional values being given by way of example.

As illustrated more specifically in FIGS. 11 and 12, in at least one embodiment of the invention, the first and second section first walls 40, 44 are offset relative to each other by a first circumferential offsetting distance 48 of 0.0276 inch. Similarly, the first and second section second walls 42, 46 are offset relative to each other by a second circumferential offsetting distance 50 of approximately 0.0276 inch.

Referring back to FIG. 1, there is shown that the intermediate section 36 typically includes a first intermediate wall portion 52 and a second intermediate wall portion 54. The first intermediate wall portion 52 extends between the first and second section first walls 40, 44 while the second intermediate wall portion 54 extends between the first and second section second walls 42, 46.

The first and second intermediate wall portions 52, 54 are angled relative respectively to the first and second section first walls 40, 44 and the first and second section second walls 42, 46 typically by a similar intermediate segment-to-wall angle 56 (see FIG. 11). In the embodiment shown, by way of example, throughout the figures, the intermediate segment-to-wall angle 56 has a value of approximately 135 degrees.

Figure 10:
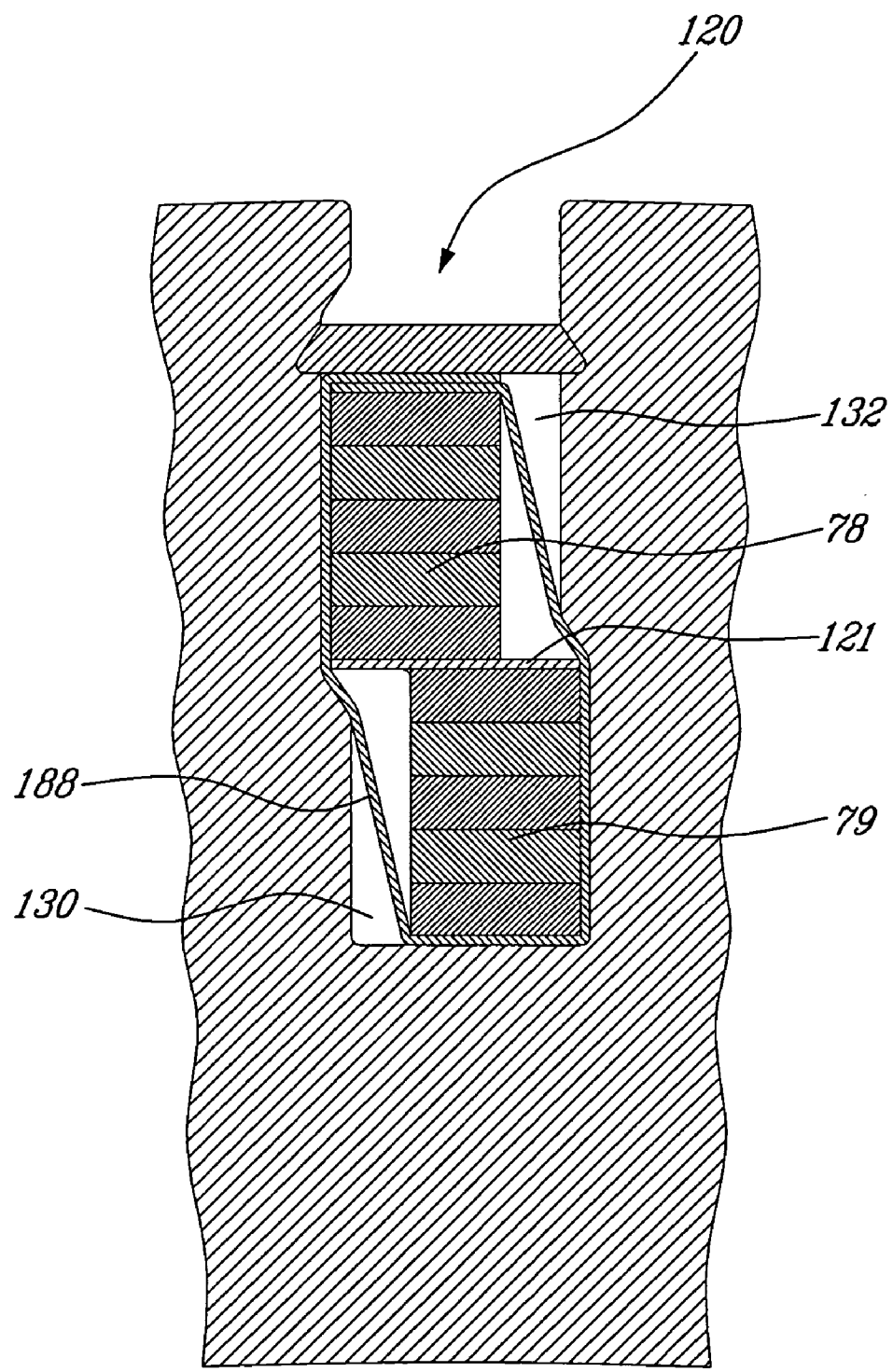
FIG. 10, in a partial cross-sectional view with sections taken out, illustrates a circumferential section of a dynamoelectric machine stator in accordance with an alternative embodiment of the invention.

In the embodiments shown throughout the figures, with the exception of FIGS. 10 and 12, the first and second intermediate wall segments are substantially radially in register with each other. In the embodiment shown in FIGS. 10 and 12, the first and second intermediate wall portions 52, 54 are radially offset relative to each other by a radial offsetting distance. Typically, the radial offsetting distance is such that the intersection between the second section first wall 44 and the first intermediate wall portion 52 is substantially radially in register with the intersection between the first section second wall 42 and the second intermediate wall portion 54.

The stator core 12 typically further comprises a winding section retaining means operatively coupled to at least one and typically all of the stator slots 20 for radially retaining corresponding winding sections positioned therein. In the shown throughout the figures, the retaining means includes a retaining plate 57 mountable within a corresponding stator slot 20 so as to extend substantially axially therein and so that the corresponding winding sections mountable therein are positionable between the slot base wall 38 and the retaining plate 57.

Typically, the slot second section 32 defines a retaining segment 58 positioned adjacent the core main peripheral surface 18. The retaining segment 58 has a pair of opposed retaining grooves formed therein for receiving corresponding peripheral portions of the retaining plate 57 and retaining the latter.

Typically, the retaining segment 58 defines a substantially flat retaining section first wall 60 and a circumferentially opposed and substantially flat retaining section second wall 62. A first retaining groove 64 is typically formed in the retaining section first wall 60 and a second retaining groove 66 is typically formed in the retaining section second wall 62.

Typically, the retaining section first wall 60 is substantially circumferentially in register or radially aligned with the first section first wall 40 and the retaining section second wall 62 is substantially circumferentially in register or radially aligned with the second section second wall 46. Also, typically, the first retaining groove 64 merges integrally with the second section first wall 44. Typically, although by no means exclusively, the first and second retaining grooves 64, 66 both taper inwardly in the direction leading towards the core main peripheral surface 18.

As illustrated more specifically in FIGS. 11 and 12, the first and second section first and second walls 40, 42, 44, and 46 typically define a substantially common and radially oriented section height 68. The first section first and second walls 40, 42 and the second section first and second walls 44, 46 define a substantially circumferentially oriented first-to-second wall spacing 70 respectively therebetween.

The section height 68 and the first-to-second wall spacing 70 are typically related to each other by a height-to-spacing ratio. In the embodiments shown throughout the figures, the height-to-spacing ratio has a value of approximately 1.23. Also, in the embodiment shown throughout the figures, the first-to-second wall spacing 70 has a value of approximately 0.2284". Furthermore, in the embodiments shown throughout the figures, each of the stator slots 20 defines a corresponding slot depth between the slot base wall 38 and the core main peripheral surface 18. The slot depth is exemplified as having a value of approximately 0.7119".

In the embodiments of the invention shown throughout the figures with the exception of FIGS. 10 and 12, the first and second intermediate wall segments 54, 56 span over an intermediate wall segment radial distance 72. The intermediate wall segment radial distance 72 typically has a value of approximately 0.0552".

Also, the stator core 12 typically defines an axially extending stator central axis 76. The core main peripheral surface 18 is located at an outer radial distance of approximately 7.9031" from the stator central axis 76 while the core auxiliary peripheral surface 19 is located at an inner radial distance of approximately 6.7913" from the stator central axis 76.

Typically, the stator winding (only part of which is shown) includes a plurality of winding sections 24. An example of a typical winding section 24 is shown in FIG. 13. Each winding section 24 typically includes two parallel conductor sides 78, 79 of substantially rectangular cross-section configured and sized for fitting respectively into two of the stator slots 20.

Each winding section 24 also includes at least one, and typically two conductor heads 80 of substantially rectangular cross-section connecting two adjacent ends of the conductor sides 78, 79. Each winding section 24 typically further includes winding leads 82, 84 at the beginning and termination, respectively, of a winding section 24 for later connection with other winding leads 82, 84 of adjacent winding sections 24.

In the embodiment shown throughout the figures, each winding section 24 includes five winding turns 90 with the winding leads 82, 84 extending in the same axial direction. It should, however, be understood that the winding sections 24 could be made out of any suitable number of turns 90 with the winding leads 82, 84 extending in the same or in opposite axial direction without departing from the scope of the present invention.

Also, each turn 90 is shown as being coated with a turn coating layer 86 of suitable coating material such as, for example, conventional insulating varnish. Furthermore, each winding section 24 is shown wrapped in a suitable section coating layer 88 made of suitable coating material such as cardboard paper or the like. It is to be noted that the layer 88 is optional and could be omitted in certain cases.

At least one, and typically both conductor heads 80 typically have a substantially complexly shaped configuration curving axially and/or radially and/or circumferentially. In the embodiment shown in FIG. 13, at least one, and preferably both conductor heads 80 show a substantially U-shaped body when seen from a top view perpendicular to the plane formed by the conductor sides 78, 79.

At least one, and preferably both conductor heads 80 show a substantially wave-shaped generally in the form of a horizontally positioned "S" when seen from a front view contained in the plane formed by the conductor sides 78, 79. At least one, and preferably both conductor heads 80 have top and bottom opposite surfaces, the top conductor head surface facing only one side of the plane formed by the conductor sides 78, 79 and the bottom conductor head surface facing an opposite side thereof.

The present invention also relates to a method for mounting a conductor section 24 part of a stator winding onto a stator core of a dynamoelectric machine. As illustrated more specifically in FIGS. 2 through 9, at least in part because of the outwardly fanning stator slots 20, the distance 92 between circumferentially opposite lateral surfaces 94 of the conductor sides 79, 78 is smaller than the distance 96 between circumferentially adjacent lateral surfaces of two corresponding stator slots 20.

In the embodiment shown in FIGS. 2 through 9, the stator slots 20 receiving the conductor sides 78, 79 of a given winding section 24 are spaced circumferentially by six stator slots 20. It should, however, be understood that the conductor sides 78, 79 may be circumferentially spaced by any suitable number of stator slots 20 without departing from the scope of the present invention.

The method, in accordance with the present invention, includes manipulating the stator sections 24 without substantially deforming the latter so as to ultimately position a first one of the conductor section sides (hereinafter referred to as first conductor side 79) into the slot first section 30 of a corresponding first one of the stator slots 20 and a second one of the conductor sides (hereinafter referred to as second conductor side 78) in the second slot section 32 of a corresponding second one of the stator slots 20. Once positioned as described above and depicted in FIG. 9, the first and second conductor sides 79, 78 are in their respective so-called operational position.

The manipulation of the conductor section 24 typically involves several steps. As illustrated in FIG. 2, an initial step includes inserting at least partially the first conductor side 79 into its corresponding stator slot 20. Typically although not necessarily, the first conductor side 79 is translated radially until the second conductor side 78 is located proximal to its corresponding slot 20 in a circumferentially offset relationship with the latter.

As shown in FIG. 3, the first conductor side 79 is then manipulated so as to clear the retaining section first wall 60 while the second conductor side 78 remains positioned radially outwardly relative to the core main peripheral surface 18. The first conductor side 79 is eventually slidably inserted into the slot second section 32 of its stator slot 20.

As shown in FIG. 3, the manipulation for allowing the first conductor side 79 to clear the retaining section first wall 60 typically involves pivoting the conductor section 24 about the first conductor side 79. With the configuration shown in FIGS. 2 through 9, the conductor section 24 is pivoted clockwise about the first conductor side 79.

As illustrated in FIG. 4, the conductor section 24 is then pivoted back to its initial radial alignment with the stator slots 20. The positioning of the first conductor side 79 into the slot first section 32 allows the second conductor section 78 to be substantially in circumferential register with its corresponding stator slot 20.

Figure 5:
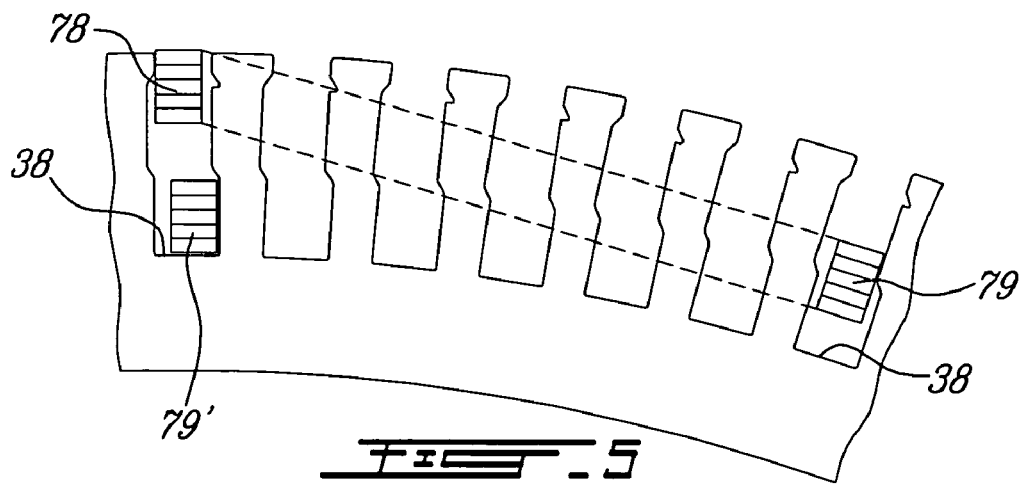
FIG. 5, in a view similar to FIG. 2, illustrates the circumferential section with a coil being mounted thereunto, the left-hand and right-hand side coil sections being radially pushed into their corresponding slots.

As illustrated in FIG. 5, with the first and second conductor sections 79, 78 now in circumferential register with their corresponding stator slots 20, the conductor section 24 is slid radially towards the slot base walls 38. It should be noted that because of the radial fanning of the stator slots 20, the position of the first conductor side 79 relative to its corresponding stator slot 20 changes in FIGS. 4 and 5 from a position wherein the first conductor side 79 is positioned adjacent the first or left-hand wall of the stator slot 20 to a position wherein the first conductor side 79 is positioned adjacent the second or right-hand wall of the stator slot 20.

Figure 6:
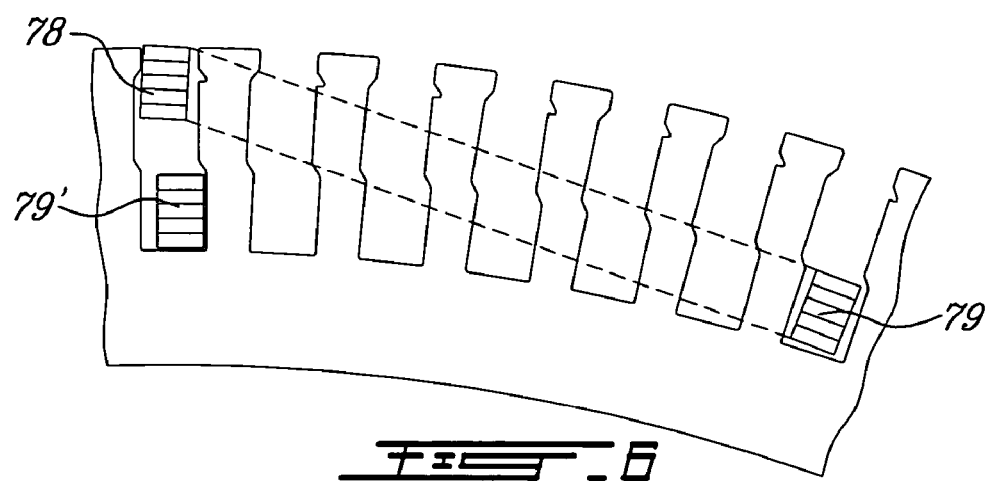
FIG. 6, in a view similar to FIG. 2, illustrates the circumferential section with a coil being mounted thereunto, the left-hand and right-hand side coil sections being inserted deeper into their corresponding slots and simultaneously rotated.
Figure 7:
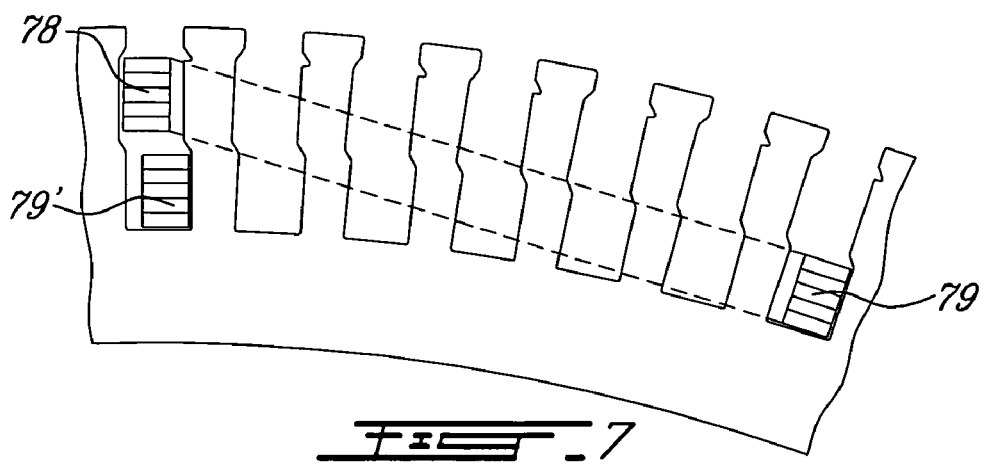
FIG. 7, in a view similar to FIG. 2, illustrates the circumferential section with a coil being mounted thereunto, the left-hand and right-hand side core sections being positioned adjacent their respective operational positions.
Figure 8:
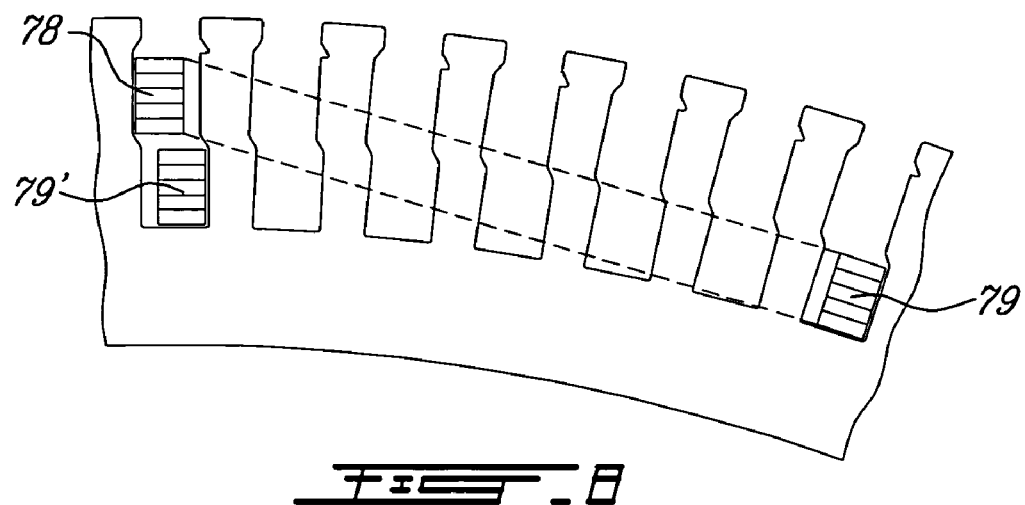
FIG. 8, in a view similar to FIG. 2, illustrates the circumferential section with a coil being mounted thereunto, the left-hand and right-hand core sections being in their respective operational positions FIG. 9, in a view similar to FIG. 2, illustrates the circumferential section with a coil being mounted thereunto, a retaining plate being mounted over the left-hand filled slot.

As illustrated in FIGS. 6, and 7, the conductor section 24 is typically rotated, again about the first conductor side 79, in a clockwise direction, and then back towards its original radial alignment in order to facilitate radial positioning of the first and second conductor sides 79, 78 to their respective operational positions shown in FIG. 8.

It should be noted that the second conductor side 78 is positioned in a substantially offset and overlying relationship relative to an already inserted first conductor side 79' part of another conductor section 24 (only part of which is shown).

Figure 9:
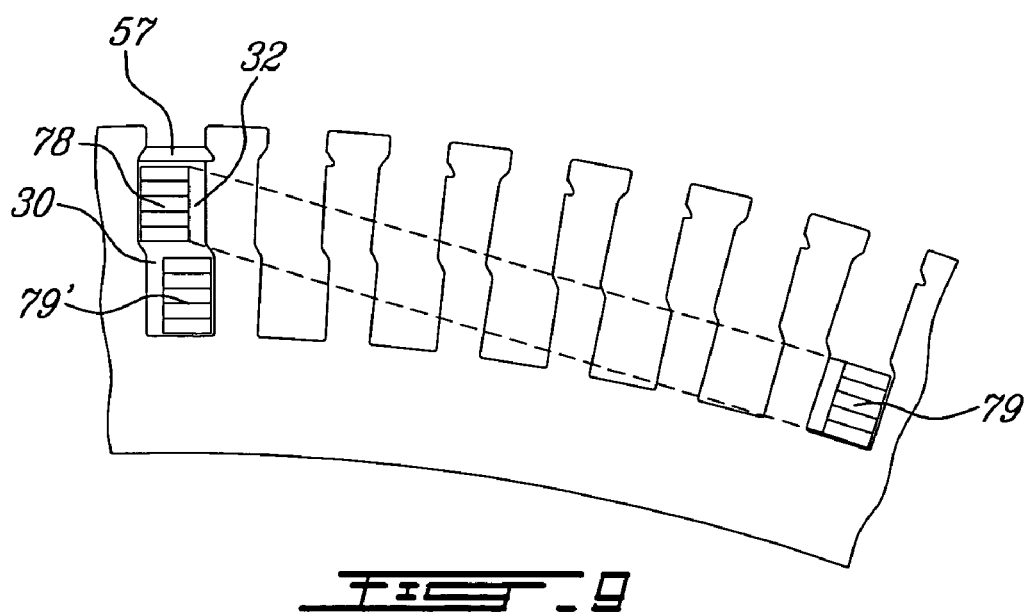

As illustrated in FIG. 9, once a given stator slot 20 is filled with a first conductor side 79' of a first conductor section 24 and the slot first section 30 and a second conductor side 78 of another conductor section in the slot second section 32 of the same stator slot 20, the retaining plate 57 is operationally position within the corresponding first and second retaining grooves 64, 66 of the retaining section 62. It should be understood that although the stator slots 20 are shown throughout the figures as having only slot first and second sections 30, 32 with corresponding first and second conductor sides 79', 78 inserted respectively therein, the stator slots 20 could be provided with any suitable number of circumferentially offset slot sections for receiving a corresponding set of conductor sides without departing from the scope of the present invention.

It is to be noted that, for clarity purposes, the insulating paper layers 88 are not illustrated in FIGS. 2 to 9.

Turning briefly to FIG. 10 of the appended drawings, which is similar to FIG. 1, an alternative embodiment of the present invention will be described. Since this alternative embodiment is very similar to the embodiment described hereinabove, only the main differences will be described hereinafter.

A main difference lies in the spacing between the conductor sides 78 and 79' once they are inserted in a slot 120. Indeed, as can be seen from FIG. 10, the two conductor sections are in very close vicinity, being separated by an insulating layer of paper 121. This close relationship is allowed by the reduction in radial length of the sections 130 and 132 with respect to the corresponding sections 30 and 32 of the slot 20 of FIG. 1.

Another difference is concerned with the insulation paper 188 that in inserted in the slot 120 before the sections 78 and 79.

Although the present invention has been described hereinabove by way of preferred embodiments thereof, it can be modified, without departing from the spirit and nature of the subject invention as defined in the appended claims.

What is claimed is:

1. A dynamoelectric machine stator core for receiving a stator winding, said stator core comprising:
   a core body defining a pair of axially opposed core end surfaces and a substantially cylindrical core main peripheral surface extending between said core end surfaces;
   a plurality of substantially axially extending stator slots circumferentially spaced in said core body, said stator slots defining intervening teeth projecting substantially radially towards said core main peripheral surface; each of said stator slots extending radially from a corresponding slot base to said core main peripheral surface;
   wherein each of said stator slots defines
   a slot first section extending radially from said slot base to a slot intermediate radial position located intermediate said slot base and said core main peripheral surface;
   a slot second section extending radially from substantially adjacent said slot intermediate radial position towards said core main peripheral surface;
   said slot first and second sections
   communicating with each other and being in a circumferentially offset relationship relative to each other, and
   being positioned, configured and sized to facilitate insertion therein of a corresponding conductor section of said stator winding with reduced needs for deforming said corresponding conductor section.

2. A stator core as recited in claim 1, wherein said slot first and second sections both extend substantially radially and wherein each of said stator slots further defines a slot intermediate section extending between said slot first and second sections, said slot intermediate section extending substantially at an angle relative to said slot first and second sections.

3. A stator core as recited in claim 1, wherein said slot first section has a substantially rectangular cross-sectional configuration, said slot first section defining a substantially flat slot base wall, a substantially flat first section first wall and a substantially flat first section second wall, said first section first and second walls both extending substantially radially and in a substantially perpendicular relationship relative to said slot base wall.

4. A stator core as recited in claim 1, wherein said slot second section has a substantially rectangular cross-sectional configuration, said slot second section defining a substantially flat second section first wall and a substantially flat second section second wall, said second section first and second walls both extending substantially radially and in a substantially perpendicular relationship relative to said slot base wall.

5. A stator core as recited in claim 1, wherein
   said slot first section has a substantially rectangular cross-sectional configuration, said slot first section defining a substantially flat slot base wall, a substantially flat first section first wall and a substantially flat first section second wall, said first section first and second walls both extending substantially radially and in a substantially perpendicular relationship relative to said slot base wall;
   said slot second section has a substantially rectangular cross-sectional configuration, said slot second section defining a substantially flat second section first wall and a substantially flat second section second wall, said second section first and second walls both extending substantially radially and in a substantially perpendicular relationship relative to said slot base wall.

6. A stator core as recited in claim 5, wherein said first and second section first walls are offset relative to each other by a first circumferential offsetting distance of approximately 0.0276 inch.

7. A stator core as recited in claim 5, wherein said first and second section second walls are offset relative to each other by a second circumferential offsetting distance of approximately 0.0276 inch.

8. A stator core as recited in claim 5, wherein said first and second section first walls are offset relative to each other by a first circumferential offsetting distance of approximately 0.0276 inch and wherein said first and second section second walls are offset relative to each other by a second circumferential offsetting distance of approximately 0.0276 inch.

9. A stator core as recited in claim 5, wherein
a first intermediate wall segment extends between said first and second section first walls;
a second intermediate wall segment extends between said first and second section second walls;
said first and second intermediate wall segments being angled relative respectively to said first and second section first walls and said first and second section second walls by an intermediate segment-to-wall angle.

10. A stator core as recited in claim 9, wherein said intermediate segment-to-wall angle has a value of approximately 135 degrees.

11. A stator core as recited in claim 9, wherein said first and second intermediate wall segments are radially offset relative to each other by a radial offsetting distance.

12. A stator core as recited in claim 11, wherein said radial offsetting distance is such that the intersection between said second section first wall and said first intermediate wall segment is substantially radially in register with the intersection between said first section second wall and said second intermediate wall segment.

13. A stator core as recited in claim 9, wherein said first and second intermediate wall segments are substantially radially in register with each other.

14. A stator core as recited in claim 1, further comprising a retaining means operatively coupled to at least one of said stator slots for radially retaining corresponding stator winding sections therein.

15. A stator core as recited in claim 14, wherein said retaining means includes a retaining plate, said retaining plate being mountable within a corresponding stator slot so as to extend substantially axially therein and so that said corresponding winding sections are positionable between said slot base and said retaining plate.

16. A stator core as recited in claim 15, wherein said slot second section defines a retaining segment positioned adjacent said core main peripheral surface, said retaining segment having a retaining groove formed therein for receiving a peripheral portion of said retaining plate and retaining the latter.

17. A stator core as recited in claim 16, wherein
said slot first section has a substantially rectangular cross-sectional configuration, said slot first section defining a substantially flat slot base wall, a substantially flat first section first wall and a substantially flat first section second wall, said first section first and second walls both extending substantially radially and in a substantially perpendicular relationship relative to said slot base wall;
said slot second section defines a substantially flat second section first wall and a substantially flat second section second wall, said second section first and second walls both extending substantially radially and in a substantially perpendicular relationship relative to said slot base wall;
said retaining segment defining a substantially flat retaining section first wall and a circumferentially opposed and substantially flat retaining section second wall, said retaining groove having a first groove segment formed in said retaining section first wall and a second groove segment formed in said retaining section second wall.

18. A stator core as recited in claim 17, wherein said retaining section first wall is substantially circumferentially in register with said first section first wall and said retaining section second wall is substantially circumferentially in register with said second section second wall.

19. A stator core as recited in claim 18, wherein said first groove segment merges integrally with said second section first wall.

20. A stator core as recited in claim 19, wherein said first and second groove segments both taper inwardly in a direction leading towards said core main peripheral surface.

21. A stator core as recited in claim 1, wherein said core main peripheral surface is located radially outwardly.

22. A stator core as recited in claim 1, wherein:
said slot first section has a substantially rectangular cross-sectional configuration, said slot first section defining a substantially flat slot base wall, a substantially flat first section first wall and a substantially flat first section second wall, said first section first and second walls both extending substantially radially and in a substantially perpendicular relationship relative to said slot base wall;
said slot second section has a substantially rectangular cross-sectional configuration, said slot second section defining a substantially flat second section first wall and a substantially flat second section second wall, said second section first and second walls both extending substantially radially and in a substantially perpendicular relationship relative to said slot base wall;
said first and second section first and second walls defining a substantially common and radially oriented section height;
said first section first and second walls and said second section first and second walls defining a substantially circumferentially oriented first-to-second wall spacing respectively therebetween;
said section height and said first-to-second spacing being related to each other by a height-to-spacing ratio having a value of approximately 1.23.

23. A stator core as recited in claim 22, wherein said first-to-second wall spacing has a value of approximately 0.2284 inch.

24. A stator core as recited in claim 23, wherein each of said stator slot defines a corresponding slot depth between said slot base and said core main peripheral surface, said slot depth having a value of approximately 0.7119 inch.

25. A stator core as recited in claim 24, wherein
a first intermediate wall segment extends between said first and second section first walls;
a second intermediate wall segment extends between said first and second section second walls;
said first and second intermediate wall segments being angle relative respectively to said first and second section first walls and said first and second section second walls by an intermediate segment-to-wall angle;

said first and second intermediate wall segments spanning over an intermediate wall segment radial distance of approximately 0.0552 inch.

26. A stator core as recited in claim 25, wherein said slot second section defines a retaining segment positioned adjacent said core main peripheral surface, said retaining segment having a retaining groove formed therein for receiving a peripheral portion of said retaining plate and retaining the latter.

27. A stator core as recited in claim 24, wherein
said stator core defines an axially extending stator central axis;
said core main peripheral surface is located radially outwardly;
said stator core further defines a radially innermost and substantially cylindrical core auxiliary peripheral surface, each of said core end surfaces having a substantially annular configuration;
said core main peripheral surface being located at an outer radial distance of approximately 7.9031 inches from said stator central axis;
said core auxiliary peripheral surface being located at an inner radial distance of approximately 6.7913 inches from said stator central axis.

28. A dynamoelectric machine stator core for receiving a stator winding, said stator core comprising:
a core body defining a pair of axially opposed core end surfaces and a substantially cylindrical core main peripheral surface extending between said core end surfaces;
a plurality of substantially axially extending stator slots circumferentially spaced in said core body, said stator slots defining intervening teeth projecting substantially radially towards said core main peripheral surface; each of said stator slots extending radially from a corresponding slot base to said core main peripheral surface;
wherein each of said stator slots defines
a radially innermost slot base wall;
circumferentially opposed first section first and second walls extending substantially perpendicularly from said slot base wall towards said core main peripheral surface;
first and second intermediate wall segments extending respectively from said first section first and second walls at an angle relative to the latter;
second section first and second walls extending respectively from first and second intermediate wall segments in a substantially parallel and circumferentially offset relationship relative respectively to said first section first and second walls;
said second section defining a retaining segment positioned adjacent said core main peripheral surface, said retaining segment having a retaining groove formed therein for receiving a peripheral portion of said retaining plate and retaining the latter.

29. A stator core as recited in claim 28, wherein said retaining segment defining a substantially flat retaining section first wall and a circumferentially opposed and substantially flat retaining section second wall, said retaining groove having a first groove segment formed in said retaining section first wall and a second groove segment formed in said retaining section second wall.

30. A stator core as recited in claim 29, wherein said retaining section first wall is substantially circumferentially in register with said first section first wall and said retaining section second wall is substantially circumferentially in register with said second section second wall.

31. A dynamoelectric machine stator core for receiving a stator winding, said stator core comprising:
a core body defining a pair of axially opposed core end surfaces and a substantially cylindrical core main peripheral surface extending between said core end surfaces;
a plurality of circumferentially spaced stator slots extending in said core body with said stator slots defining intervening teeth projecting substantially radially towards said core main peripheral surface; each of said stator slots extending radially from a corresponding slot base to said core main peripheral surface; each of said stator slots defining a first slot wall and a second slot wall both extending substantially radially into said core body in a substantially parallel and circumferentially spaced relationship relative to each other; said first slot wall having a circumferentially recessed first wall recess located substantially adjacent said core main peripheral surface; said second slot wall having a circumferentially recessed second wall recess located substantially adjacent said slot base.

32. A stator core as recited in claim 31, wherein said first wall recess is spaced from said core main peripheral surface by a first wall retaining section.

33. A stator core as recited in claim 32, wherein said first wall retaining section is substantially circumferentially in register with the remainder of said slot first wall.

34. A stator core as recited in claim 31, wherein said first wall recess and said second wall recess are radially and circumferentially spaced relative respectively to the remainder of said first and second slot walls by respectively a first and a second intermediate wall segment.

35. A stator core as recited in claim 31, wherein said slot first and second walls are respectively provided with a first retaining slot segment and a second retaining slot segment formed respectively therein at a radial position located between said first wall recess and said core main peripheral surface; said stator core also including a retaining plate insertable into said first and second retaining slots so as to extend axially and transversally across said stator slot.

36. A dynamoelectric machine comprising:
a stator having
a core body made of ferromagnetic material, said core body defining a pair of axially opposed core end surfaces and a substantially cylindrical core main peripheral surface extending between said core end surfaces;
a plurality of substantially axially extending stator slots circumferentially spaced in said core body, said stator slots defining intervening teeth projecting substantially radially towards said core main peripheral surface; each of said stator slots extending radially from a corresponding slot base to said core main peripheral surface;
wherein each of said stator slots defines
a slot first section extending radially from said slot base to a slot intermediate radial position located intermediate said slot base and said core main peripheral surface;
a slot second section extending radially from substantially adjacent said slot intermediate radial position towards said core main peripheral surface;
said slot first and second sections
communicating with each other and being in a circumferentially offset relationship relative to each other;
a stator winding embedded in said stator slots;
a rotor made of ferromagnetic material positioned so as to define a substantially cylindrical stator-to-rotor gap between said core main peripheral surface and said rotor, said rotor being supported for rotational movement relative to said stator, said rotor including conductive means for interacting with a magnetic field produced in said stator-to-rotor gap when said stator winding is energized;

whereby said slot first and second sections are positioned, configured and sized to facilitate insertion therein of a corresponding conductor section of said stator winding with reduced needs for deforming said corresponding conductor section.

37. A dynamoelectric machine as recited in claim 36, wherein said rotor is positioned radially externally relative to said stator.

38. A dynamoelectric machine as recited in claim 37, wherein said stator winding includes a plurality of winding section, each of said winding sections including two parallel conductor sides of substantially rectangular cross-section configured and sized for fitting respectively into two of said stator slots, said conductor sides defining a plane; and at least one conductor head of substantially rectangular cross-section connecting two adjacent ends of said conductor sides.

39. A dynamoelectric machine as recited in claim 38, wherein said at least one conductor head shows a substantially "U"-shaped body when seen from a top view perpendicular to said plane, and a substantially waved-shape generally in the form of a horizontally positioned "S" when seen from a front view contained in said plane.

40. A dynamoelectric machine as recited in claim 39, wherein said at least one conductor head has top and bottom opposite surfaces, said top surface facing only one side of said plane and said bottom surface facing only an opposite side thereof.

41. A lamination plate for forming the stator core of a stator, part of a dynamoelectric machine, when aligned and stacked with similar lamination plates, said lamination plate comprising:

a plate body made of ferromagnetic material, said plate body defining a pair of axially opposed plate end surfaces and a substantially annular plate main peripheral surface extending between said plate end surfaces;

a plurality of substantially axially extending stator slots circumferentially spaced in said plate body, said stator slots defining intervening teeth projecting substantially radially towards said plate main peripheral surface; each of said stator slots extending radially from a corresponding slot base to said plate main peripheral surface;

wherein each of said stator slots defines a slot first section extending radially from said slot base to a slot intermediate radial position located intermediate said slot base and said plate main peripheral surface;

a slot second section extending radially from substantially adjacent said slot intermediate radial position towards said plate main peripheral surface;

said slot first and second sections communicating with each other and being in a circumferentially offset relationship relative to each other.

* * * * *